UNITED STATES PATENT OFFICE.

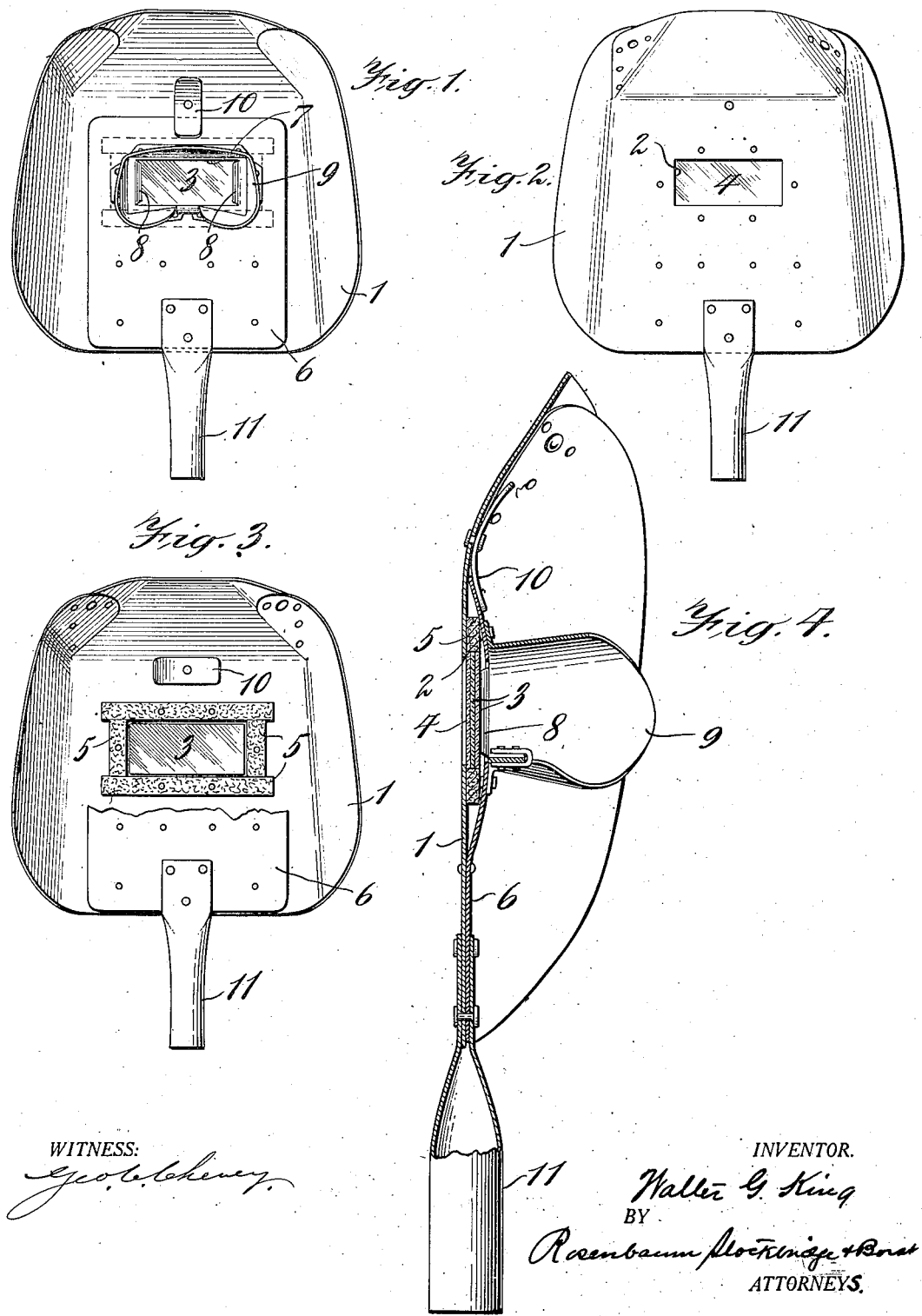

WALTER G. KING, OF NEW YORK, N. Y., ASSIGNOR TO JULIUS KING OPTICAL COMPANY, A CORPORATION OF NEW YORK.

WELDING-SHIELD.

1,370,121.           Specification of Letters Patent.      Patented Mar. 1, 1921.

Application filed November 1, 1919. Serial No. 335,116.

*To all whom it may concern:*

Be it known that I, WALTER G. KING, a citizen of the United States, residing at the city of New York, in the county of New York and State of New York, have invented certain new and useful Improvements in Welding-Shields, of which the following is a full, clear, and exact description.

My invention relates to welding shields for screening the eyes and face from the intense light of a welding arc and protecting the face from the heat and minute flying particles in the region of the arc, and has more especial application to hand shields used by inspectors for temporary observation as distinguished from the helmets or goggles which are worn by the welders.

By reason of the nature of their use these hand shields are commonly subjected to more or less rough usage, and they are frequently laid down in such proximity to the arc that they are exposed to a high degree of heat, sometimes actually coming into contact with one of the conductors or electrodes, with the result that if there is much metal in the construction, not only is the metal melted or otherwise injured, but as frequently happens the operator is liable to receive a severe electric shock.

An object of my invention is to provide a shield of this character which will be sufficiently strong and durable to withstand the ordinary usage, which will eliminate all leakage of light, in which metal is entirely eliminated or is minimized, and which, while holding the lenses securely in place, will enable them to be easily and conveniently removed and reinserted, as they must be with comparative frequency in use to replace the cover glass when it becomes pitted so as to materially impair its transparency. Other objects and advantages of my invention will appear from the following description.

In accordance with my invention I make the shield entirely of a suitable non-conducting material, such as fiber, and I reinforce the flat central portion with an overlapping fiber sheet which is secured at its bottom end to the inner face of the body of the shield, and extends over the observation opening with its upper end and thus screens the lens opening against any possible leakage of light and resiliently holds the lenses in their frames. Preferably this reinforcing sheet is provided with outwardly turned lips at the observation opening to bear against the lenses and hold them in their frame, the top edge of the sheet being held down by a button or other suitable device.

I shall now describe the illustrated embodiment of my invention, and shall thereafter point out my invention in claims.

Figure 1 is an inside or rear view and Fig. 2 is an outside or front view of a shield embodying my invention; Fig. 3 is a view similar to Fig. 1 with the overlapping sheet member partially broken away; Fig. 4 is a vertical sectional elevation on an enlarged scale.

In the form shown the body member 1 is composed of a suitable non-conducting sheet material such as fiber, which is rearwardly bent at the top and sides to give the device the usual protective semi-concave shape, the central and bottom portion being left flat, as shown. In the upper part of this flat portion the usual observation opening 2 is provided, which is covered by the lenses 3 in front of which is the plane cover glass 4. These lenses are seated against the rear face of the body member within a frame 5 of felt or other suitable cushioning and insulating material secured to the body member in any practicable way, as by rivets. Overlying these lenses is the reinforcing sheet 6, also of fiber, which is secured at its bottom to the inner face of the body member, as by rivets, its upper end which overlaps the lenses being left free. This sheet 6 is provided with an observation opening 7 in register with the opening 2, and has outwardly turned lips 8 at the ends of the opening which resiliently bear against the inner face of the lenses 3 and retain them on their seat. A hood or eye shield 9 of fiber surrounds the opening 7 and is carried by the sheet member 6. A button 10 pivoted to the body member is adapted to lock over the top edge of the sheet member 6 when the device is ready for operation and resiliently hold the lips 8 against the lenses. Secured to the bottom of the shield is a suitable handle 11 of fiber.

It will be observed that there is no way for light to leak through the shield since the sheet 6 effectively covers the lens opening. The sheet 6 also serves to materially reinforce and strengthen the shield. Furthermore, there is an entire absence of metal parts.

To take out the lenses it is only necessary to release the button 10 and bend back the top of the sheet member 6 sufficiently to afford access to the lenses, and they are as easily inserted and are secured in place after insertion by merely turning the button 10 over the top edge of the sheet member.

It will be understood that, while I have described one way of carrying out my invention, it is in no wise limited thereto, but that various modifications may be made in the illustrated embodiment without departing from the scope of the appended claims.

I claim:

1. The combination, in a welding shield, of a body of non-conductive material having an observation opening therein, a lens frame surrounding the opening, lens retaining means comprising a resilient sheet member attached to the body at one end and having its other end free and overlying the lens with its free end, and having an opening therein registering with the observation opening, and a button for quickly securing the free end of the sheet member to and releasing it from the body.

2. The combination, in a welding shield, of a body of non-conductive material having an observation opening therein, a lens frame surrounding the opening, and lens retaining means comprising a resilient sheet member attached to the body at one end and overlying the lens with its free end, and having an opening therein registering with the observation opening, and having outwardly turned lips at the margin of the opening, bearing resiliently against the inner face of the lens.

3. The combination, in a welding shield, of a body of non-conductive material having an observation opening therein, a lens frame surrounding the opening, lens retaining means comprising a resilient sheet member attached to the body at one end overlying the lens with its free end, and having an opening therein registering with the observation opening, and an eye shield carried by the sheet member and surrounding the opening therein.

4. The combination, in a welding shield, of a fiber body having an observation opening therein, a lens frame of non-conductive material surrounding the opening, and lens retaining means comprising a fiber sheet member attached to the body at one end and overlying the lens with its free end and having an opening therein registering with the observation opening and having outwardly turned lips at the margin of the opening bearing resiliently against the inner face of the lens, a fiber eye shield carried by the sheet member and surrounding the opening therein, and a button coöperative with the free end of the sheet member to hold the sheet member in lens retaining position.

In witness whereof, I subscribe my signature.

WALTER G. KING.